United States Patent [19]  [11] 3,925,329
Heinrich et al.  [45] Dec. 9, 1975

[54] PRODUCTION OF POLYMERS IN POWDERED FORM WHICH CONTAIN CARBOXYLIC ACID OR CARBOXYLIC ANHYDRIDE GROUPS

[75] Inventors: Bernhard Heinrich, Frankenthal; Herbert Naarmann, Wattenheim; Peter Thoma, Frankenthal, all of Germany

[73] Assignee: BASF Aktiengesellschaft, Ludwigshafen (Rhine), Germany

[22] Filed: Dec. 28, 1973

[21] Appl. No.: 429,133

[52] U.S. Cl. ........ 260/78.5 R; 260/80 M; 260/80.8; 260/88.1 PC; 8/115.6
[51] Int. Cl.[2] ..................... C08F 2/14; C08F 6/10
[58] Field of Search ..... 260/78.5 R, 80 M, 88.1 PC, 260/80.8

[56] References Cited
UNITED STATES PATENTS
3,035,033  5/1962  Schweitzer et al. ............... 260/88.1
3,178,395  4/1965  Muskat .............................. 260/78.5
3,388,106  6/1968  Muskat .............................. 260/78.5

*Primary Examiner*—John Kight, III
*Attorney, Agent, or Firm*—Johnston, Keil, Thompson & Shurtleff

[57] ABSTRACT

A process for the production in powdered form of a polymer containing carboxylic acid or carboxylic anhydride groups in which the monomers are polymerized with agitation in the presence of an auxiliary liquid in such a way that the surface of the mixture is increased by a multiple with respect to the stagnant mixture and then the auxiliary liquid is distilled off. The powdered polymer is particularly suitable as a surface sizing agent for paper.

8 Claims, No Drawings

PRODUCTION OF POLYMERS IN POWDERED FORM WHICH CONTAIN CARBOXYLIC ACID OR CARBOXYLIC ANHYDRIDE GROUPS

The invention relates to a process for the production of polymers containing carboxylic acid or carboxylic anhydride groups in powdered form.

It is known that copolymers containing carboxylic acid or carboxylic anhydride groups can be prepared by solution, bulk or emulsion polymerization. To obtain powdered polymers it is necessary to dry the solutions or dispersions or to grind the polymers obtained by bulk polymerization. Disadvantages of these procedures include the expenditure on apparatus which do not permit continuous operation and also the subsequent damage to the polymers during drying or grinding.

It is an object of the present invention to provide a process according to which copolymers containing carboxylic acid groups or carboxylic anhydride groups can be obtained in powdered form in a simple manner by polymerization of acrylic acid, methacrylic acid or maleic anhydride with one or more than one other monomer in the presence of an auxiliary liquid at a temperature of from 70° to 150°C and distilling off the auxiliary liquid in which the disadvantages of the abovementioned prior art methods are absent.

We have found that this object is achieved by increasing the surface area of the mixture of monomers and auxiliary liquid in the reaction zone by at least twenty times by mechanical stirring and distilling off the auxiliary liquid while stirring after the mixture has acquired a viscosity of at least 20,000 centipoises measured at 20°C.

Acrylic acid and/or methacrylic acid and other monomers which are copolymerizable with these compounds are polymerized in such amounts according to the process that the copolymers contain from 5 to 40% of the monomers containing carboxylic acid groups. In the case of maleic anhydride the limits are from 10 to 50% by weight. Other monomers which can be copolymerized with the monomers containing carboxylic acid or carboxylic anhydride groups include for example esters of acrylic acid and/or methacrylic acid with alcohols of the type HO—CH$_2$—R (in which R is H, CH$_3$, C$_2$H$_5$, C$_3$H$_7$, C$_4$H$_9$, C$_5$H$_{11}$,

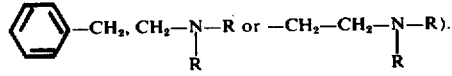

It is preferred to obtain according to the process copolymers of styrene with acrylic acid and/or methacrylic acid which contain from 20 to 35% by weight of polymerized units of monomers containing carboxyl groups. These copolymers may contain polymerized units of up to 10% of other monomers in addition to styrene.

Particularly suitable auxiliary liquids are those which boil at from 70° to 150°C. These are especially hydrocarbons such as benzene, toluene, xylene, cyclohexane or aliphatic hydrocarbons such as octane or nonane. Alcohols such as propanol, isopropanol and butanol are also suitable.

The ratio of monomers to auxiliary liquid by weight may be from 0.5 : 1 to 1.5 : 1. It is preferred to use mixtures or solutions of monomers and auxiliary liquid which contain from 40 to 60% of the monomers.

Polymerization is preferably carried out with catalysts generating free radicals, for example organic peroxides or azo compounds. The amount of catalyst depends on the desired molecular weight of the polymer and is generally from 0.1 to 5% by weight based on the monomers.

In the reaction zone in which the polymerization proceeds the surface area of the mixture should be increased by mechanical stirring to at least twenty times and preferably at least fifty times that of the stagnant or unstirred mixture. A stagnant or unstirred mixture is regarded as having a surface area of 1 m$^2$ per m$^3$. Thus an increase of the surface area by from twenty or fifty times in relation to 1 m$^3$ of mixture gives a surface area of 20 m$^2$ or 50 m$^2$.

This increase in surface area of the mixture in which polymerization takes place is most conveniently achieved by continuous or periodic introduction of the monomers and auxiliary liquid into a rotary dryer. This is a horizontal cylinder through whose longitudinal axis stirring means are passed whose arms dip into the mixture. The desired minimum increase in the surface area may be achieved by appropriate variation of the rotational speed. The auxiliary liquid is distilled off while stirring mechanically after the viscosity of the mixture has reached at least 20,000 centipoises measured at 20°C.

According to an embodiment of the process which operates particularly advantageously the temperature of the mixture which contains the polymerizing monomers is kept at from 70° to 90°C in a first stage. At a viscosity of 500 centipoises measured at 20°C the mixture is transferred to a second stage. The polymerizing mixture may be stirred in the first stage; this is advantageous but not essential. In the second stage in which as stated above the surface area of the polymerizing mixture is increased the mixture is kept at from 90° to 130°C until a viscosity of 20,000 centipoises measured at 20°C has been reached. Then in a third stage the auxiliary liquid is distilled off at a temperature less than 130°C. This method may be made continuous for example by carrying out all stages of the reaction in one reaction zone whose length is from once to twenty times the diameter of the reaction zone. An example of an apparatus suitable for carrying out the reaction is a rotary dryer as manufactured by List.

The method according to the invention is particularly suitable for the production of copolymers having a molecular weight of up to 100,000 (measured according to the method of Fikentscher, see below). The powdered products usually have a particle size of from 0.001 to 0.1 mm and a bulk density in the range from 100 to 750 kg/m$^3$.

The auxiliary liquid may be distilled off at atmospheric or at subatmospheric pressure. It is most convenient to use a pressure within the range from 10 to 500 mm.

Powdered polymers prepared according to the invention are suitable for example as surface sizing agents in the production of paper.

The following Examples illustrate the invention. In the Examples the parts are parts by weight. The K values are determined according to Fikentscher, Cellulose-Chemie, 13 (1932), page 60.

EXAMPLE 1

104 parts of styrene is mixed with a solution of 98 parts of maleic anhydride in 200 parts of octane. The mixture has 1 part of azodiisobutyronitrile added to it and is then introduced into a paddle dryer. The stirrer in the paddle dryer is moved so that the surface area of the mixture is increased twenty-five times by the stirring action. The mixture is kept for an hour at 85°C with continuous stirring until the mixture has a viscosity of at least 20,000 centipoises (measured at 20°C). The octane is then removed continuously at a pressure of 200 mm while being continuously stirred. After about three hours the solvent has been removed. A fine white powder is obtained which has a K value of 35 and dissolves satisfactorily in concentrated ammonia solution.

A mixture is polymerized while stirring in a polymerization vessel under the same conditions. There is no increase in the surface area. An inhomogeneous reaction solution is obtained containing 20% of copolymer in suspension. After filtration and removal of the solvent a polymer is obtained which has a K value of 47 and which does not dissolve completely in concentrated ammonia solution.

EXAMPLE 2

70 parts of styrene and 30 parts of acrylic acid are dissolved in 100 parts of isopropanol. 1 part of azoisobutyronitrile is added to the solution which is introduced into a paddle dryer which is kept at 85°C. The surface area of the mixture is increased by fifty times by the movement of the paddles. The internal temperature rises to 90°C after thirty minutes. A viscosity of 21,500 centipoises is set up. The solvent is distilled off at atmospheric pressure while stirring continuously. After another two hours the solvent residue is evaporated at 300 mm and 90°C. A finely divided copolymer is obtained having a K value of 40.

By repeating the above procedure in a polymerization vessel provided with a stirrer a styrene-acrylic acid copolymer is obtained after three hours in 50% isopropanol solution. To convert this polymer into powdered form further operations such as spray drying or a similar drying method are necessary.

EXAMPLE 3

72 parts of acrylic acid is mixed with 0.5 part of butanediol diacrylate and 200 parts of benzene and 2 parts of benzoyl peroxide. The mixture is introduced into a paddle dryer and heated for thirty minutes at 80°C. The surface area is increased eighty fold by the stirring movement of the paddle stirrer. After a viscosity of 26,000 centipoises has been set up the solvent is withdrawn with continuous stirring at 90° to 100°C in two hours. A finely powdered product is obtained which when dissolved at 0.1% strength in 5% ammonia solution has a viscosity of 500 centipoises.

By carrying out the treatment under the same conditions as described above in a polymerization vessel and working up the product in a second operation under conventional conditions, i.e. on a drying roll, a finely powdered polymer is obtained which has a viscosity of 1200 centipoises in 0.1% solution in 5% ammonia solution. It is evident that by the drying process a crosslinking has taken place which does not occur in the working up described above.

EXAMPLE 4

70 parts of styrene and 30 parts of acrylic acid are polymerized in a paddle dryer in the presence of 100 parts of isopropanol and 3 parts of azodiisobutyronitrile at 85°C for two hours; the surface area was increased 25 times. After a viscosity of 500 centipoises (measured at 20°C in a Brookfield viscometer) has been reached the temperature is raised in the course of thirty minutes to 100°C and kept constant for thirty minutes. The viscosity of the reaction solution is now 20,000 centipoises (measured at 20°C) and distilling off of the solvent is begun and completed within three hours at 100°C.

The speed of the paddle shaft is 10 rpm. The product obtained is a homogeneous white powder which dissolves well in ammonia solution.

EXAMPLE 5

60 parts of styrene and 40 parts of methacrylic acid are polymerized in a paddle dryer in the presence of 100 parts of isopropanol and 3 parts of azodiisobutyronitrile at 82°C for two hours; the surface area was increased 25 times. After a viscosity of 550 centipoises (measured at 20°C in a Brookfield viscometer) has been reached the temperature is raised to 100°C in the course of thirty-five minutes and kept constant for another thirty minutes. The viscosity of the reaction solution then amounts to 20,000 centipoises (measured at 20°C) and a start is made to the distilling off of the solvent at 100°C which is completed within three hours.

The speed of the paddle shaft is 12 rpm. The product obtained is a homogeneous white powder which dissolves well in ammonia solution.

We claim:

1. A process for the production in powdered form of a polymer containing carboxylic acid or carboxylic anhydride groups which comprises polymerizing acrylic acid, methacrylic acid or maleic anhydride with one or more than one other monomers selected from the group consisting of styrene and esters of acrylic acid and methacrylic acid with alcohols of the structure $HO-CH_2-R$ wherein R is hydrogen, alkyl of from one to five carbons, benzyl, $CH_2-NR_2$ or $CH_2-CH_2-NR_2$, in such amounts that the resulting copolymers contain from 5 to 40% by weight of the monomers containing carboxylic acid groups or from 10 to 50% by weight of maleic anhydride, said polymerization being conducted at a temperature of from 70° to 150°C and in the presence of an alcohol or hydrocarbon auxiliary liquid having a boiling point of from 70° to 150°C, wherein the ratio by weight of monomers to auxiliary liquid is from 0.5:1 to 1.5:1, and wherein the surface area of the mixture in the reaction zone is increased by mechanical stirring to at least twenty times that of the unstirred mixture, and distilling off the auxiliary liquid while stirring after the mixture has reached a viscosity of at least 20,000 centipoises measured at 20°C.

2. A process as set forth in claim 1 wherein in a first stage the mixture is kept at a temperature of from 70° to 90°C and after a viscosity of 500 centipoises measured at 20°C has been reached is kept in a second stage at a temperature of from 90° to 130°C until a viscosity of 20,000 centipoises at 20°C has been reached and then the auxiliary liquid is distilled off at a temperature of less than 130°C.

3. A process as set forth in claim 1 wherein said auxiliary liquid is selected from the group consisting of benzene, toluene, xylene, cyclohexane, octane, nonane, propanol, isopropanol and butanol.

4. A process as set forth in claim 1 wherein said other monomer is styrene.

5. A process as set forth in claim 1 wherein said mixture of monomers and auxiliary liquid contains from 40 to 60% of the monomers.

6. A process as set forth in claim 1 wherein said auxiliary liquid is distilled off at a pressure of from 10 to 500 mm.

7. A process as set forth in claim 1 wherein said copolymer contains from 20 to 35% by weight of monomers containing carboxylic acid groups, styrene, and up to 10% by weight of monomers selected from the group consisting of esters of acrylic acid and methacrylic acid with alcohols of the structure $HO-CH_2-R$ wherein R is hydrogen, alkyl of from one to five carbons, benzyl, $CH_2-NR_2$ or $CH_2-CH_2-NR_2$.

8. A process as set forth in claim 1 wherein the surface area of the mixture in the reaction zone is increased by mechanical stirring to at least fifty times that of the unstirred mixture.

\* \* \* \* \*

UNITED STATES PATENT AND TRADEMARK OFFICE
CERTIFICATE OF CORRECTION

PATENT NO. : 3,925,329
DATED : December 9, 1975
INVENTOR(S) : Bernhard Heinrich et al.

It is certified that error appears in the above-identified patent and that said Letters Patent are hereby corrected as shown below:

In the Heading, insert -- [30] Foreign Application Priority Data   January 3, 1973   Germany   P 23 00 093.3 --

Signed and Sealed this

Twenty-eighth Day of September 1976

[SEAL]

Attest:

RUTH C. MASON
Attesting Officer

C. MARSHALL DANN
Commissioner of Patents and Trademarks